Nov. 7, 1961

D. B. PALL 3,007,334

METHOD AND APPARATUS FOR DETERMINING THE
MAXIMUM PORE SIZE OF HYDRAULIC
FILTER ELEMENTS

Filed Nov. 30, 1956

INVENTOR.
DAVID B. PALL

BY
Campbell, Brumbaugh, Free & Graves

ATTORNEYS

United States Patent Office 3,007,334
Patented Nov. 7, 1961

3,007,334
METHOD AND APPARATUS FOR DETERMINING THE MAXIMUM PORE SIZE OF HYDRAULIC FILTER ELEMENTS
David B. Pall, Roslyn Heights, N.Y., assignor to Pall Corporation, Glen Cove, N.Y., a corporation of New York
Filed Nov. 30, 1956, Ser. No. 625,444
3 Claims. (Cl. 73—38)

This invention relates to the filtration art as it concerns hydraulic filters capable of filtering extremely small particles of solid matter on the order of less than 80 microns. More particularly, the invention is concerned with a method and apparatus by means of which the maximum pore sizes of such filter elements can be readily determined and controlled.

One of the standard and widely used tests for determining the porosity of hydraulic filter elements having extremely small pore sizes is the so-called glass bead test. Briefly, this test involves the steps of preparing a liquid suspension of glass beads having random diameters ranging up to say 80 microns and forcing the mixture under pressure through the filter element to be tested. The oil and glass beads which pass through the filter are collected and the laborious technique of separating the beads as to size and of measuring the largest beads is carried out.

Overall, the standard glass bead test is exacting, time-consuming work. Moreover, the test is susceptible of errors of considerable magnitude due either to human failure by the personnel conducting the test or to inherent shortcomings of the test. Also, it does not afford any indication of the location of the oversized pores, thus offering no opportunity for controlling the maximum pore size in any given unit.

Figure 1:
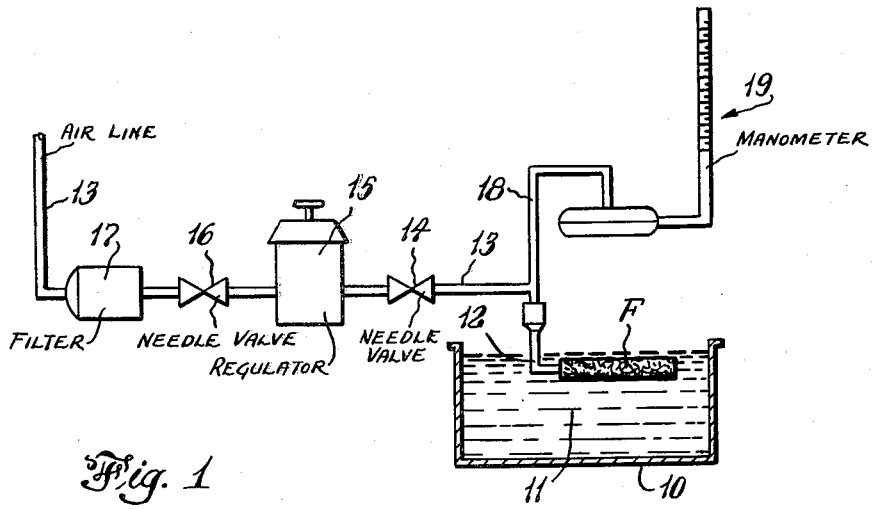
Figure 2:
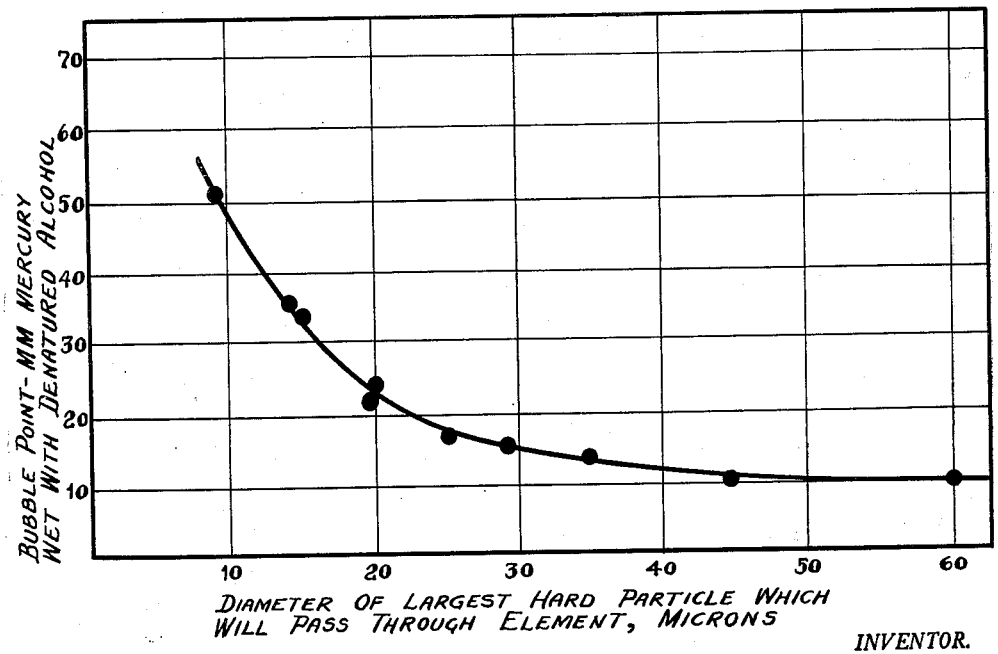

In accordance with the present invention, therefore, there are provided a method and apparatus by means of which the maximum pore sizes of hydraulic filter elements can be determined not only with extreme accuracy but in a radically shorter time than is required to conduct even the most cursory of glass bead tests. Also, the method and apparatus facilitate as part of the same test procedure the locating of each oversized port so that repairs can be readily made to enable the units to meet the standards, no matter how exacting, set for them. The method and apparatus of the present invention are described below having reference where appropriate to the accompanying drawing in which:

FIGURE 1 is a diagrammatic illustration of a test apparatus for assisting in carrying out the method; and FIGURE 2 is a graph plotting the bubble point of a given filter element against particle size.

Broadly speaking, the present invention is based on the discovery that filter elements capable of filtering from liquid particles in the range of up to about 80 microns act as a barrier to the passage of gas under a predetermined range of pressures, and that for any given basic design of filter elements there is a correlation between the maximum particle size which can find its way through the filter element and the gas pressure on one side of the filter element which is able to establish a bubble in static liquid on the other side.

Referring to FIGURE 2, there is illustrated a graph in which the bubble point in millimeters of mercury is plotted against the diameter of the target bead particle, measured in microns, which will pass through the filter element, the filter element in this case being a woven wire mesh element rolled and sintered in accordance with the disclosure of the pending application, Serial No. 562,127, filed January 30, 1956, now Patent No. 2,925,-650, and sold under the trademark "Rigimesh." In the range 8 to 40 microns, the curve plotting the bubble point against particle size passed for this type of filter shows an inverse proportionality between the two and follows the relationship:

$$\text{Bubble point (mm. Hg)} = \frac{445}{\text{max. particle passed, in microns}}$$

which is empirically determined from the graph of FIGURE 2. It will be observed that the points on the graph, representing tests conducted in accordance with the present invention, are in certain cases slightly off the curve. However, the deviation from the standard represents a linear deviation on the order of only 2 microns or less, which is well within the standards of accuracy demanded of filters.

Referring now to FIGURE 1, there is illustrated a typical apparatus for carrying out the present invention including a tank 10 filled with a liquid such for example as denatured alcohol 11. Fitted in the tank at a point close to the surface of the liquid is a mounting chuck 12 adapted to support a test piece in the form of a filter element F, in this case a corrugated cylinder of "Rigimesh" closed at its end remote from the chuck. Preferably, the upper surface of the filter element F is as close to the surface of the liquid as is possible. The chuck 12 includes a central air duct to pass air into the filter element, the duct being connected at its other end by means of a conduit 13, a first needle valve 14, a pressure regulator 15, a second needle valve 16, and a dirt filter 17, to a suitable source of air pressure (not shown). Also connected to the conduit 13 adjacent the chuck 12 is a conduit 18 to which is connected an indicator which can take the form for example of a well-type manometer 19 for indicating static pressure. The chuck 12 is so arranged that the test pieces can be conveniently rotated for close examination of its surfaces throughout the test.

The test is carried out by applying air pressure to the insides of the filter element F and raising the pressure slowly toward the value corresponding to the micron rating or pore size of the filter element while watching the exterior surface of the element for the appearance of a bubble. The manometer reading at the time of appearance of the first bubble is the bubble point for the filter element. If desired, the pressure can be increased still further to locate and measure the second, third, fourth, etc., largest openings. If a bubble does not occur up to the point of rating of the filter element, the element can be assumed to have passed its test. In the event a bubble point appears before the standard for the filter element is reached, indicating an oversized pore, the location of the oversized pore will be readily discernible for it will coincide with the bubble before it detaches from the filter element. The location of the oversized pore can best be determined by rotating the filter element until the bubble point appears on the top surface just below the liquid level.

In order to control the maximum pore size and thus enable each filter to meet exacting standards, oversized pores located in the above manner may be plugged with suitable materials such as synthetic resins, glasses, glasslike materials, hard and soft solder, welding, and sprayed-on metal coatings. In each case the sealant applied should be one which is compatible with the conditions of use. For example, epoxy resin has been found to be an appropriate sealant for controlling the maximum pore size of the above-mentioned "Rigimesh" filter elements.

The bubble point in any case is a sharply defined, easily reproducible parameter applying to each filter element, which correlates accurately with the largest glass bead or other solid particle which would pass through the filter element.

While a representative test fixture apparatus has been described above for practicing the method of the present invention, it will be understood that there are changes in its detail which can be carried out within the scope of the invention. Thus, for example, a well-type mercury manometer, while preferable, can be replaced by a water manometer or other suitable gas pressure integrating device. The invention should not, therefore, be regarded as limited except as defined by the following claims.

I claim:

1. A method for determining the pore size of the largest pores in a metallic filter element, which comprises impregnating that element with ethyl alcohol and covering one surface of the element with ethyl alcohol under a fixed static head of pressure, applying a gas under pressure to the opposite surface, and increasing the gas pressure applied thereto until a bubble of gas appears on the ethyl alcohol-covered face of the filter element, measuring the gas pressure applied at the bubble point, and comparing this gas pressure with known gas pressures corresponding to known pore diameters to determine the pore size at the bubble point.

2. A method in accordance with claim 1 in which the filter element is a wire mesh which comprises interwoven metallic filaments disposed in fixed relative positions, the filaments being joined by sintered integration of the metal.

3. A method in accordance with claim 1 which includes sealing pores revealed to be oversize by the method.

References Cited in the file of this patent

UNITED STATES PATENTS

| | | |
|---|---|---|
| 445,706 | Stevenson | Feb. 3, 1891 |
| 1,218,154 | Zahm | Mar. 6, 1917 |
| 2,636,380 | Van Dorn | Apr. 28, 1953 |
| 2,697,935 | Gordon | Dec. 28, 1954 |
| 2,795,855 | Worthen | June 18, 1957 |

Dedication 3,007,334.—*David B. Pall*, Roslyn Heights, N.Y. METHOD AND APPARATUS FOR DETERMINING THE MAXIMUM PORE SIZE OF HYDRAULIC FILTER ELEMENTS. Patent dated Nov. 7, 1961. Dedication filed Feb. 17, 1966, by the assignee, *Pall Corporation*.

Hereby dedicates to the public claims 1 to 3 of said patent.

[*Official Gazette May 31, 1966.*]